(12) United States Patent
Su et al.

(10) Patent No.: US 7,046,770 B2
(45) Date of Patent: May 16, 2006

(54) MULTIMEDIA MESSAGING SYSTEM AND METHOD FOR CONTROLLING MESSAGE PROCEDURES

(75) Inventors: Chi Chung Su, Tu-chen (TW); Shuangjian He, Shenzhen (CN); Yuan Xu, Shenzhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 340 days.

(21) Appl. No.: 10/330,621

(22) Filed: Dec. 26, 2002

(65) Prior Publication Data

US 2004/0047452 A1    Mar. 11, 2004

(30) Foreign Application Priority Data

Sep. 11, 2002    (TW) .............................. 91120665 A (51) Int. Cl.
*H04M 11/00*    (2006.01)

(52) U.S. Cl. ............................... 379/88.13; 379/88.22

(58) Field of Classification Search ............... 379/67.1, 379/69, 71, 88.12, 88.16, 88.18, 88.22, 88.23, 379/88.25
See application file for complete search history.

(56) References Cited

U.S. PATENT DOCUMENTS 6,411,684 B1* 6/2002 Cohn et al. .............. 379/88.14

* cited by examiner

*Primary Examiner*—Ovidio Escalante
(74) *Attorney, Agent, or Firm*—Wei Te Chung (57) ABSTRACT

A multimedia messaging system and method for controlling message procedures. The multimedia messaging system comprises: a database for storing data on message procedures, wherein the data on message procedures are used for defining procedures for messages of various classifications and modes of transmission for each of the procedures; a feedback receiving sub-module for receiving sending results and feedback messages sent by message receivers; a time control sub-module for setting a scheduled processing time for each of the current messages; a message status determination sub-module for determining statuses of processing of the second messages; a message procedure control sub-module for selecting next procedures and setting the next procedures as respective current procedures; a message sending processing sub-module for obtaining data on controlling procedures and first messages, and for generating the second messages, wherein the second messages comprise message classifications, processing steps, first message contents, clients, transmission mode codes and client addresses; a message sending module for selecting modes of transmission according to information on transmission modes in the second messages, and for sending the second messages to corresponding message receivers.

12 Claims, 8 Drawing Sheets

| Group Name | Group Code |
|---|---|
| Editorial | Group_A |
| Retailer | Group_B |

611 Group Data List

FIG. 4A

| Client Name | Group Code1 | Group Code2 | Mobile Phone | E-mail | Fax |
|---|---|---|---|---|---|
| Tom | Group_A | Group_B | XXXXXX | XXXXXX | XXXXXX |
| Andy | Group_B | | XXXXXX | | XXXXXX |

612 Client Data List

FIG. 4B

| Message Provider | Classification Name | Classification Code | Group Code1 | Group Code2 |
|---|---|---|---|---|
| Provider A | News | AF_news | Group_C | Group_A |
| Provider B | Stocks Message | AF_stocks | Group_D | Group_F |

613 Message Classification Data List

FIG. 4C

| Classification Code | Procedure Code | Process Time | Transmission Mode | Sending Overtime | Sending Failure | No Feedback | Feedback Received | Current Procedure |
|---|---|---|---|---|---|---|---|---|
| AF_news | news_01 | 10,000 | SMS | news_02 | news_02 | news_03 | OKend | Yes |
| AF_news | news_02 | 8,000 | SMS | news_03 | news_03 | news_03 | OKend | No |
| AF_news | news_03 | 8,000 | PDA | news_05 | news_04 | news_04 | OKend | No |
| AF_news | news_04 | 8,000 | PDA | news_03 | news_04 | news_04 | OKend | No |
| ...... | | | | | | | | |
| AF_news | news_n | 8,000 | xxxx | Failend | Failend | Failend | OKend | No |

615
Message Procedure Data List

MULTIMEDIA MESSAGING SYSTEM AND METHOD FOR CONTROLLING MESSAGE PROCEDURES

BACKGROUND OF THE INVENTION

1. Field of the Invention

The present invention relates to a multimedia messaging system and method, and more particularly to a system and method for controlling message procedures and selecting appropriate modes of transmission.

2. Description of Related Art

These days many means of communication are available for people to contact each other, such as SMS (Short Message Service), PDA (Personal Digital Assistant) and E-mail. Communication technology has greatly changed the way of life of many people. In May 2001, the GSM (Global System for Mobile communications) Association reported that over 500 billion short messages were sent by way of the GSM system in the first quarter of 2001. More and more message service providers are to providing message facilities such as financial information, stock information, news and entertainment information. With the development of communications technology and widespread business applications thereof, message services need to be reliable and timely. For instance, when a client receives a message, he/she should send return information to a message provider confirming receipt. The client may not timely receive messages because of the network congestion, shutdown of equipment, or failure of part of the network. One solution for this problem is to send the messages by way of alternative means. For example, U.S. Pat. No. 5,995,594, issued on Nov. 30, 1999 discloses a system and method for message alerting in a multimedia messaging system. When a message provider sends an alert E-mail to a mail box of a client, the message provider also sends by way of alternative means. The alert informs the client via SMS that the E-mail has been sent out. The alert is continually sent until the client sends confirmation of receipt of the E-mail to the message provider.

However, the above-described system and method cannot ensure that the client timely receives the messages. This is particularly a problem when a short message receiver of the client is in power-off mode.

SUMMARY OF THE INVENTION

Accordingly, an object of the present invention is to provide a multimedia messaging system and method for effectively controlling message procedures.

In order to accomplish the above-mentioned objects, the present invention provides a multimedia messaging system and method for controlling message procedures. A preferred embodiment of the system comprises a database for storing data on message procedures, wherein the data on message procedures are used for defining procedures for messages of various classifications and modes of transmission for each of the procedures; a feedback receiving sub-module for receiving sending results and feedback messages sent by message receivers; a time control sub-module for setting a scheduled processing time for each of the current messages; a message status determination sub-module for determining statuses of processing of the second messages; a message procedure control sub-module for selecting next procedures and setting the next procedures as respective current procedures; a message sending processing sub-module for obtaining data on controlling procedures and first messages, and for generating the second messages, wherein the second messages comprise message classifications, processing steps, first message contents, clients, transmission mode codes and client addresses; a message sending module for selecting modes of transmission according to information on transmission modes in the second messages, and for sending the second messages to corresponding message receivers.

A preferred embodiment of the multimedia messaging method comprises the following steps of:
(a) receiving an original message sent by a message provider by accessing an original message cache, and generating one or more corresponding first messages according to basic setting data obtained by accessing a database;
(b) obtaining an initial procedure for the first messages by querying data on message procedures stored in a database, and setting the initial procedures as a current procedure;
(c) initializing the current procedure, and setting a predetermined scheduled time for the current procedure;
(d) generating second messages according to the current procedure and data on the first messages, each of the second messages comprising a message classification, a processing step, a first message content, a transmission mode code and a sending address;
(e) sending the second messages, and generating sending results for the second messages;
(f) receiving the sending results and feedback messages sent by the message receivers;
(g) determining whether further processing of the one or more of the second messages is required, based on the determination of a status of processing of the second messages, wherein the four statuses of processing of any procedure are defined: sending failure, processing overtime, no feedback and feedback received;
(h) obtaining a next procedure, setting the next procedure as a current procedure I further processing of one or more of the second messages is required, and returning to the step (c) and proceeding accordingly until no further processing is required.

According to the system and method as described above, the processing procedure and transmission media are controlled based on various sending processing statuses. Therefore the clients can timely receive urgent messages.

Other objects, advantages and novel features of the present invention will be drawn from the following detailed description of the present invention with the attached drawing, in which:

DETAILED DESCRIPTION OF THE INVENTION

Figure 1:
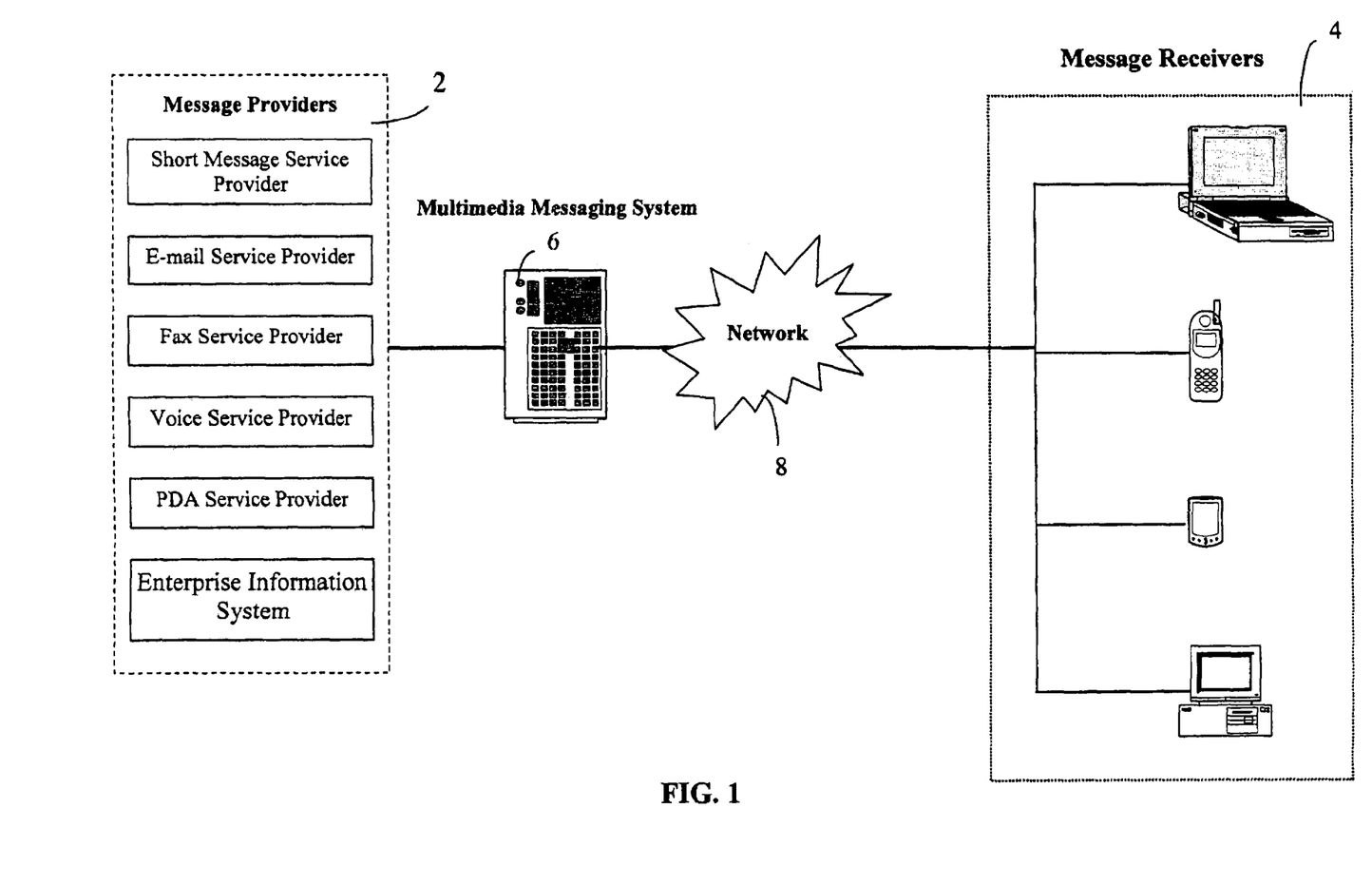
FIG. 1 is a schematic diagram of an application environment of a multimedia messaging system in accordance with a preferred embodiment of the present invention, the application environment including message providers and message receivers.

FIG. 1 is a schematic diagram of an application environment of a multimedia messaging system 6 in accordance with a preferred embodiment of the present invention. The multimedia messaging system 6 is linked to a plurality of message providers 2 for receiving various original messages. The multimedia messaging system 6 processes received original messages, and generates corresponding first messages. The first messages comprise respective received original messages. The first messages then are changed into second messages in the multimedia messaging system 6. The second messages comprise respective first messages. By means of a communication network 8, the multimedia messaging system 6 sends various generated second messages to corresponding message receivers 4. The message providers 2 may be any one or more of a short message service provider, an E-mail service provider, a fax service provider, a voice service provider, a PDA (Personal Digital Assistant) service provider, and an enterprise information system (EIS). Once registered in the multimedia messaging system 6, each message provider 2 can provide various original messages for the multimedia messaging system 6. The message receivers 4 may be any one or more of a personal computer, a mobile phone, a personal digital assistant, and a laptop computer. Each message receiver 4 corresponds to a so-called client of the multimedia messaging system 6. The communication network 8 may for example be the Internet or a wireless network.

Figure 2:
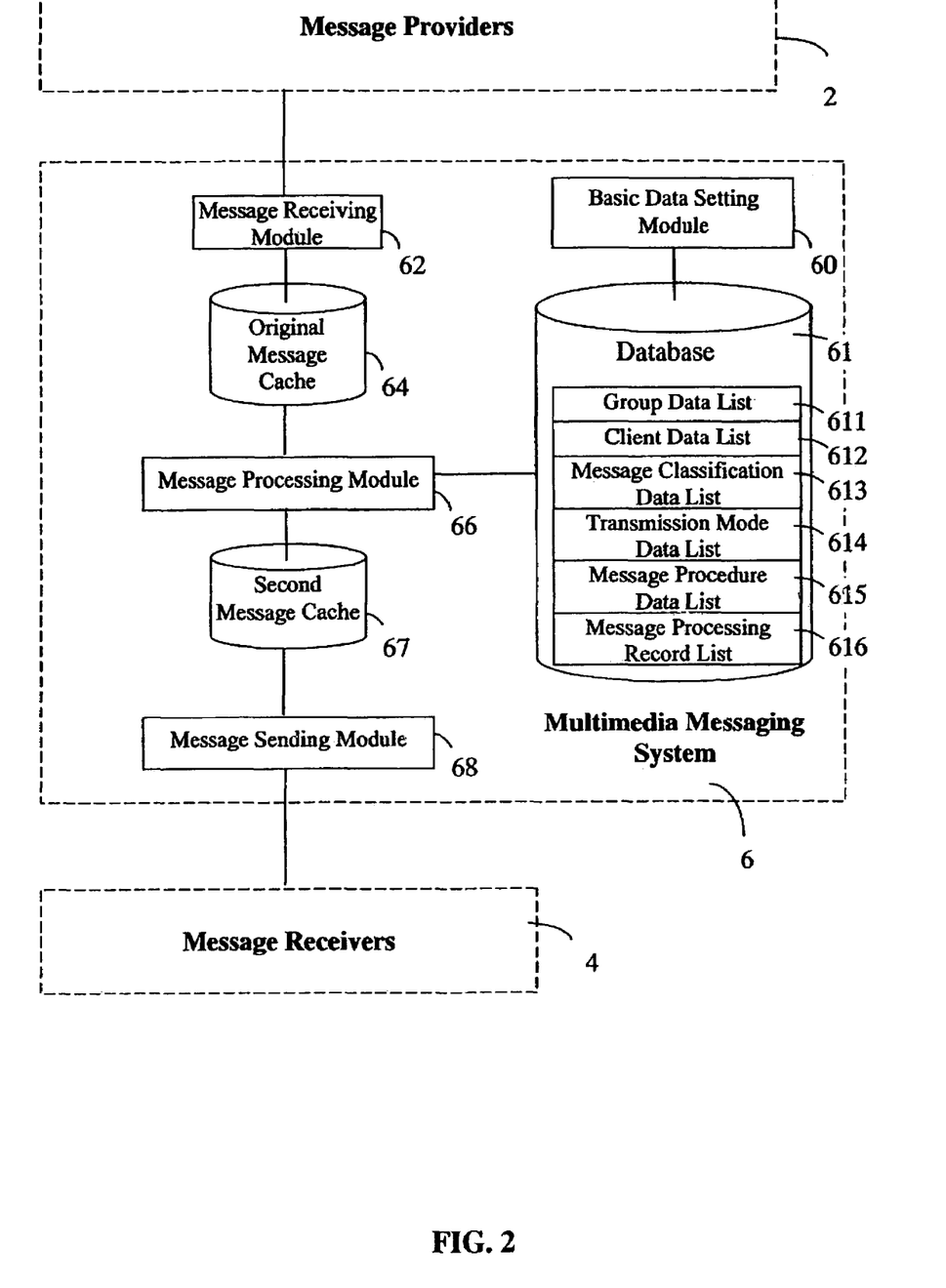
FIG. 2 is a block diagram of infrastructure of the multimedia messaging system of FIG. 1, also showing connection between the multimedia messaging system and the message providers and message receivers.

FIG. 2 is a block diagram of infrastructure of the multimedia messaging system 6, also showing connection between the multimedia messaging system 6 and the message providers 2 and message receivers 4. The multimedia messaging system 6 comprises a basic data setting module 60, a database 61, a message receiving module 62, an original message cache 64, a message processing module 66, a second message cache 67, and a message sending module 68. The basic data setting module 60 is used for setting relevant basic data, which includes message classification data, group data, transmission mode data and message procedure data. The basic data are stored in various lists in the database 61. The lists include a group data list 611, a client data list 612, a message classification data list 613, a transmission mode data list 614, a message procedure data list 615, and a message processing record list 616.

The message receiving module 62 receives original messages from the message providers 2, and stores the received original messages in the original message cache 64. The message processing module 66 accesses the original message cache 64 to obtain original messages, and reconstitutes the original messages into a plurality of second messages according to correlative information stored in the database 61. The second messages each comprise a transmission mode code, a client code, a receiving address, and an original message content. The second messages are stored in the second message cache 67. The message sending module 68 retrieves the second messages from the second message cache 67, and sends the retrieved second messages to corresponding message receivers 4.

Figure 3:
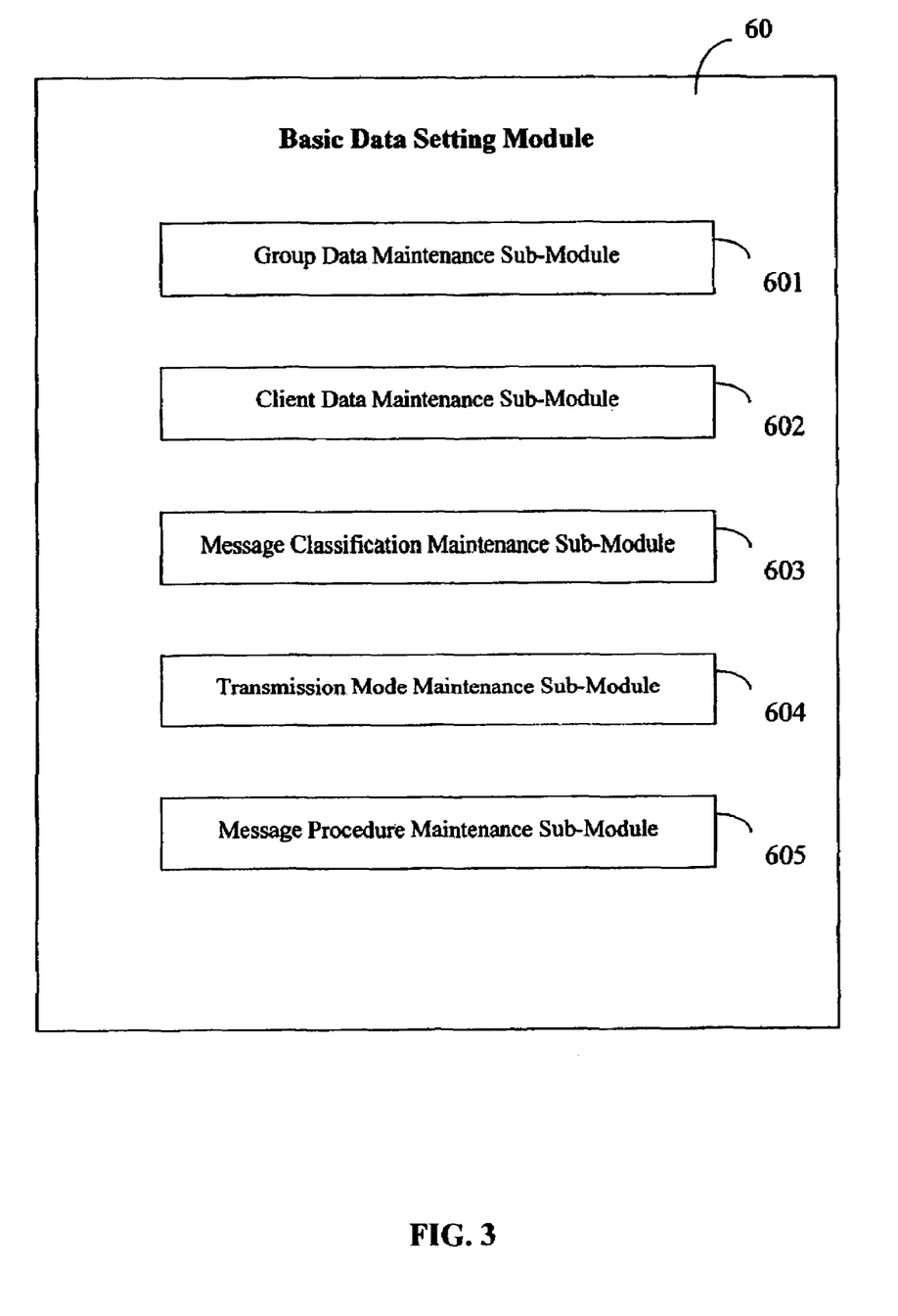
FIG. 3 is a schematic diagram of infrastructure of a basic data setting module of the multimedia messaging system of FIG. 1.

FIG. 3 is a schematic diagram of infrastructure of the basic data setting module 60 of the multimedia messaging system 6. The basic data setting module 60 comprises a group data maintenance sub-module 601, a client data maintenance sub-module 602, a message classification maintenance sub-module 603, a transmission mode data maintenance sub-module 604, and a message procedure maintenance sub-module 605. The group data maintenance sub-module 601 is used for adding, modifying, deleting and querying group data. The client data maintenance sub-module 602 is used for adding, modifying, deleting and querying client data. The message classification maintenance sub-module 603 is used for adding, modifying, deleting and querying data on message classifications. The transmission mode maintenance sub-module 604 is used for adding, modifying, deleting and querying data on transmission media. The message procedure data maintenance sub-module 605 is used for adding, modifying, deleting, and querying data on message procedures.

Figure 4A:
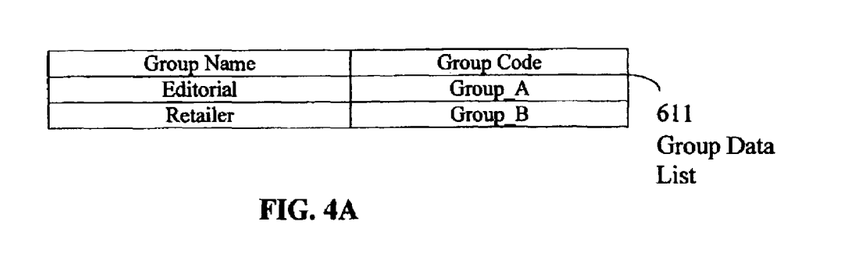
FIG. 4A illustrates an exemplary group data list in accordance with the present invention.

FIG. 4A illustrates an exemplary group data list 611 in accordance with the present invention. The group data list 611 comprises columns for group name and group code. For example, a group name may be "editorial," and a corresponding group code may be "Group_A". Another group name may be "retailer," and a corresponding group code may be "Group_B".

Figure 4B:
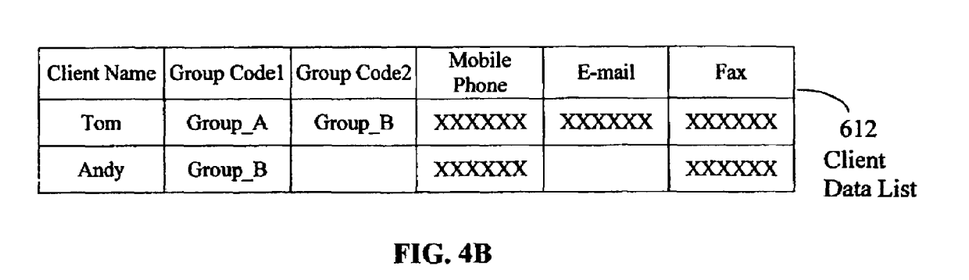
FIG. 4B illustrates an exemplary client data list in accordance with the present invention.

FIG. 4B illustrates an exemplary client data list 612 in accordance with the present invention. The client data list 612 comprises columns for client name, group codes, and contact modes. Group codes indicate one or more groups that each client belongs to. Contact modes include mobile phone, E-mail, and fax.

Figure 4C:
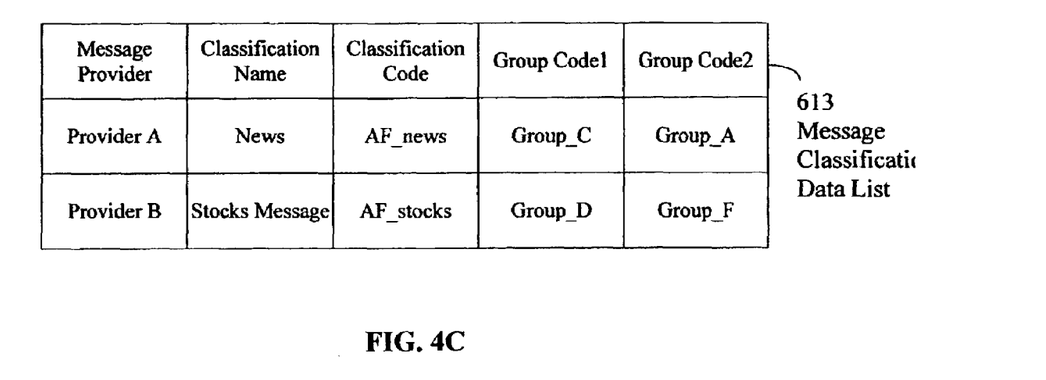
FIG. 4C illustrates an exemplary message classification data list in accordance with the present invention.

FIG. 4C illustrates an exemplary message classification data list 613 in accordance with the present invention. The message classification data list 613 comprises columns for message provider, message classification name, message classification code, and group codes. If more than one group code is indicated for a particular message classification name of a particular message provider, then any original message of that classification by that message provider is sent to all the client groups indicate by the group codes.

Figure 4D:
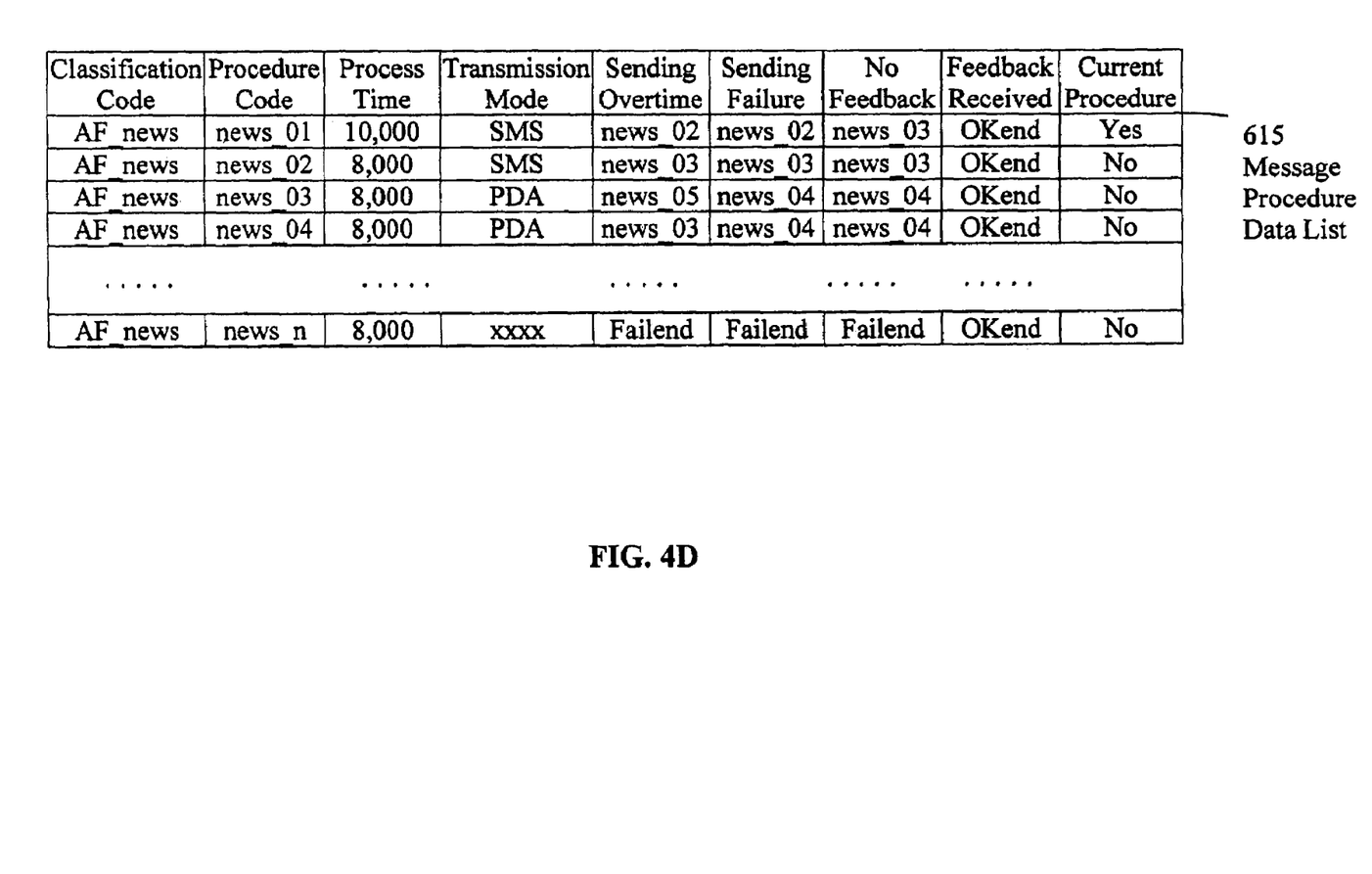
FIG. 4D illustrates an exemplary message procedure data list in accordance with the present invention.

FIG. 4D illustrates an exemplary message procedure data list 615 in accordance with the present invention. The message procedure data list 615 is used for recording a mode of transmission of each second message, a status of processing of a procedure corresponding to the second message, and a next procedure required for the second message. The message procedure data list 615 comprises columns for: classification code, procedure code, process time, transmission mode, sending overtime, sending failure, no feedback, feedback received, and current procedure. Process time is an actual time needed by the multimedia messaging system 6 to process each procedure, and is used for determining whether processing of the procedure is overtime. Transmission mode shows a transmission medium through which the multimedia messaging system 6 sends messages to clients for each procedure. For example, the transmission mode for the procedure "news_01" is SMS. Four statuses of processing of any procedure are defined: sending overtime, sending failure, no feedback, and feedback received. These processing statuses are used to determine a next procedure the system should process. Sending overtime means that the actual processing time of a message procedure exceeds a predetermined scheduled time. Sending failure means the message sending module 68 cannot send any second messages. No feedback means that the message sending module 68 has sent second messages, but has not received feedback messages from the message receivers 4 within a predetermined scheduled time. Feedback received means that the message sending module 68 has sent second messages, and has received feedback messages from the message receivers 4 within the predetermined scheduled time.

Figure 5:
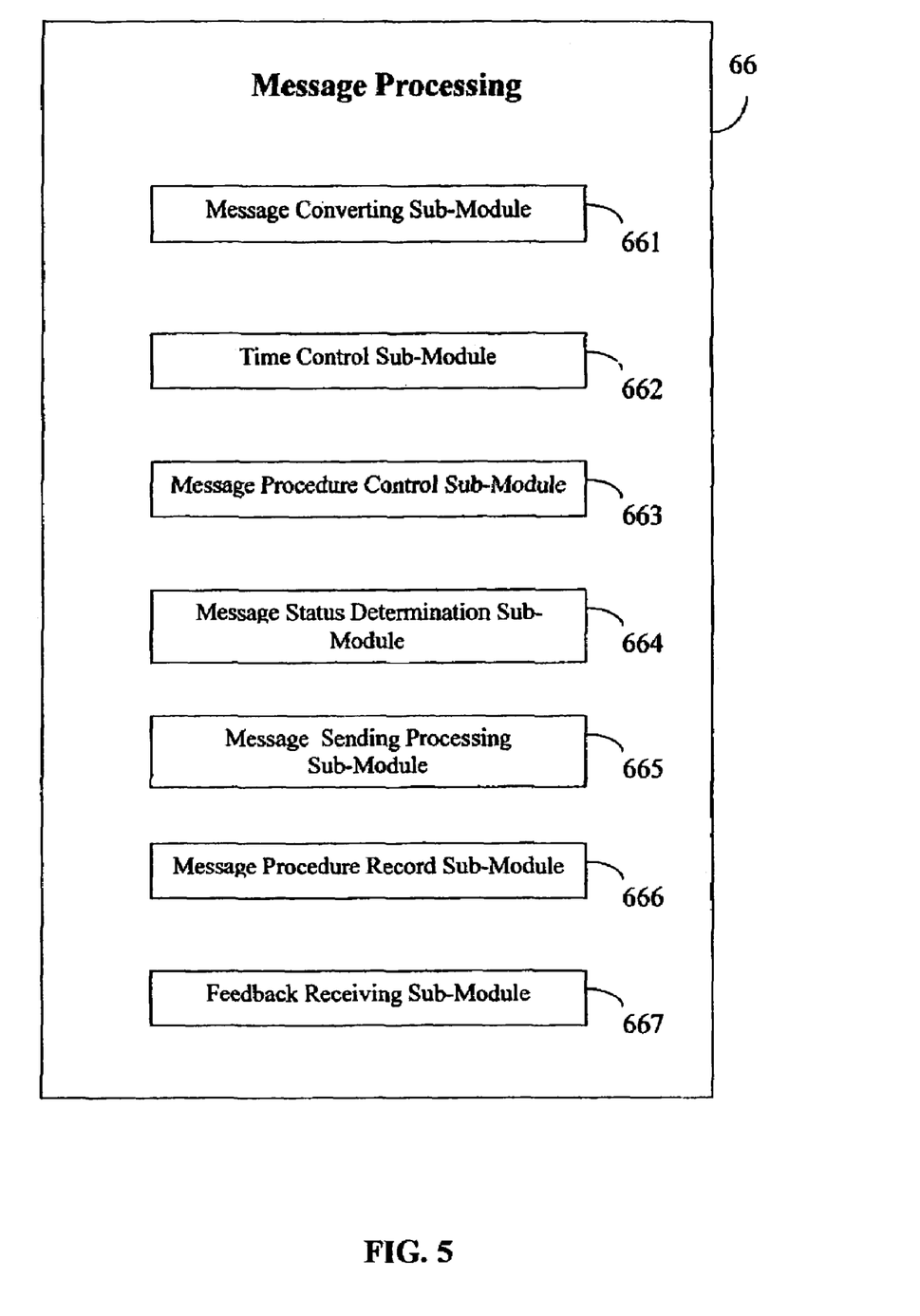
FIG. 5 is a schematic diagram of infrastructure of a message processing module of the multimedia messaging system of FIG. 1.

FIG. 5 is a schematic diagram of infrastructure of the message processing module 66 of the multimedia messaging system 6. The message processing module 66 comprises a message converting sub-module 661, a time control sub-module 662, a message procedure control sub-module 663, a message status determination sub-module 664, a message sending processing sub-module 665, a message procedure record sub-module 666, and a feedback receiving sub-module 667. Functions of the above-mentioned sub-modules 661–667 are detailed in the following description.

Figure 6:
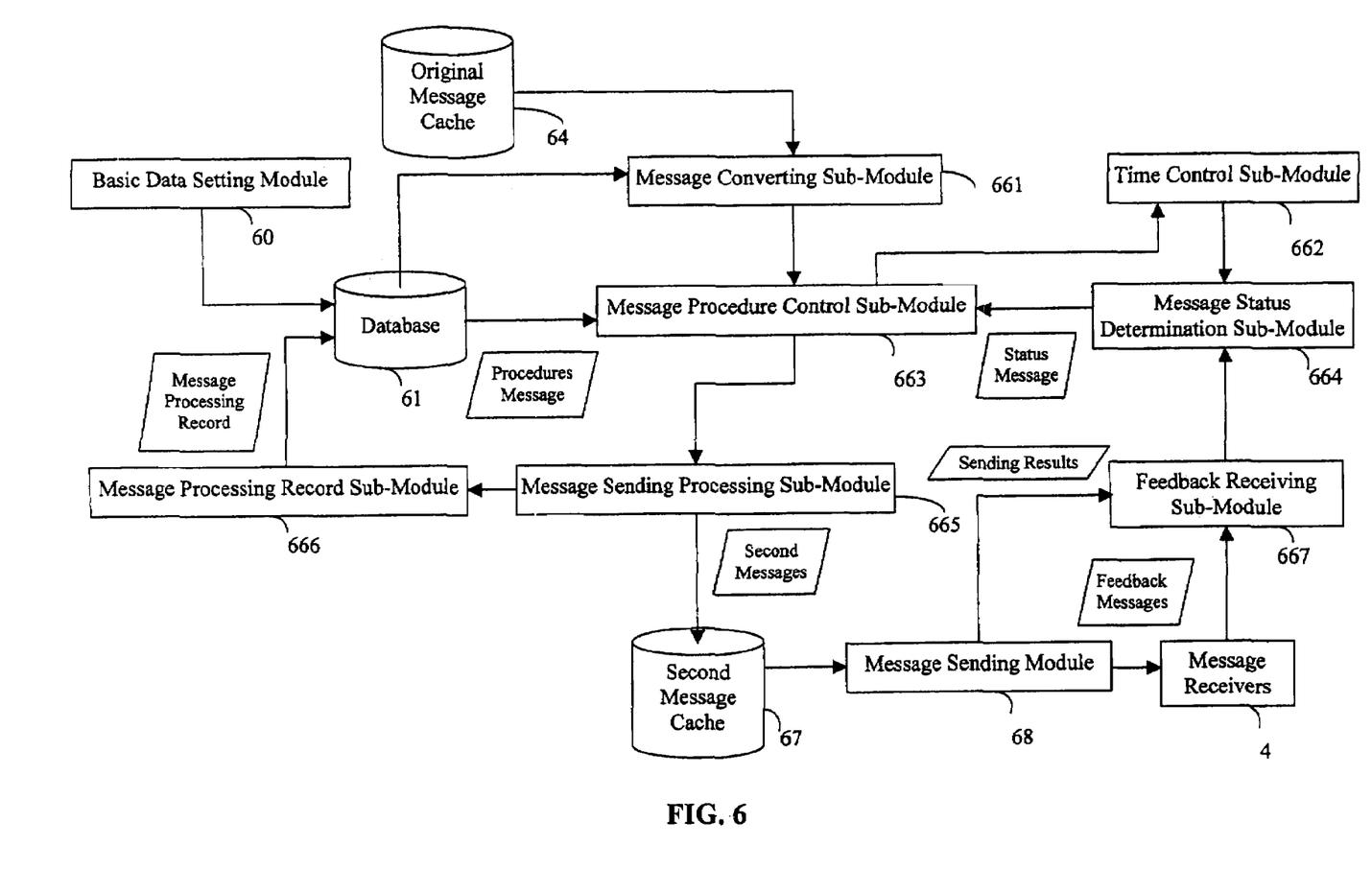
FIG. 6 is a flow chart of data transfer among parts of the multimedia messaging system of FIG. 1.

FIG. 6 is a flow chart of data transfer among the parts of the multimedia messaging system 6. A system administrator sets basic data for sending second messages via the basic data setting module 60. The basic data are stored in the database 61. The message converting sub-module 661 receives an original message by accessing the original message cache 64, obtains basic data relating to the original messages, and generates one or more corresponding first messages. Each first message comprises a message classification, an original message content, and a client. The message procedure control sub-module 663 obtains an initial procedure for each of the first messages by querying data on message procedures stored in the database 61 and sets the initial procedure as a current procedure. Said data comprise a message classification, a processing step, a client, and a transmission mode code. The time control sub-module 662 initializes the current procedure, and sets a scheduled processing time for the current procedure. The message sending processing sub-module 665 obtains the first messages and the data on message procedures, and generates corresponding second messages. The second messages each comprise a message classification, a processing step, a first message content, a client, a transmission mode code, and a sending address. The second messages are stored in the second message cache 67. The message procedure record sub-module 666 generates a message processing record according to results of processing generated by the message sending processing sub-module 665, and stores the message processing record in the message processing record list 616 of the database 61. The message sending module 68 obtains the second messages from the second message cache 67, selects modes of transmission according to the information on transmission modes in the second messages, and sends the second messages to corresponding messages receivers 4. The message sending module 68 generates a sending result for each second message. The sending result may be either success or failure. The message receivers 4 send feedback messages after receiving second messages that need feedback confirmations. The feedback receiving sub-module 667 receives sending results and feedback messages. The message status determination sub-module 664 determines a status of processing of each second message according to the actual processing time of the second message, the sending result and the feedback message. The message status determination sub-module 664 then generates a status message, and sends the status message to the message procedure control sub-module 663. The message procedure control sub-module 663 changes a processing procedure or ends processing of the second messages, based on the status message.

Figure 7:
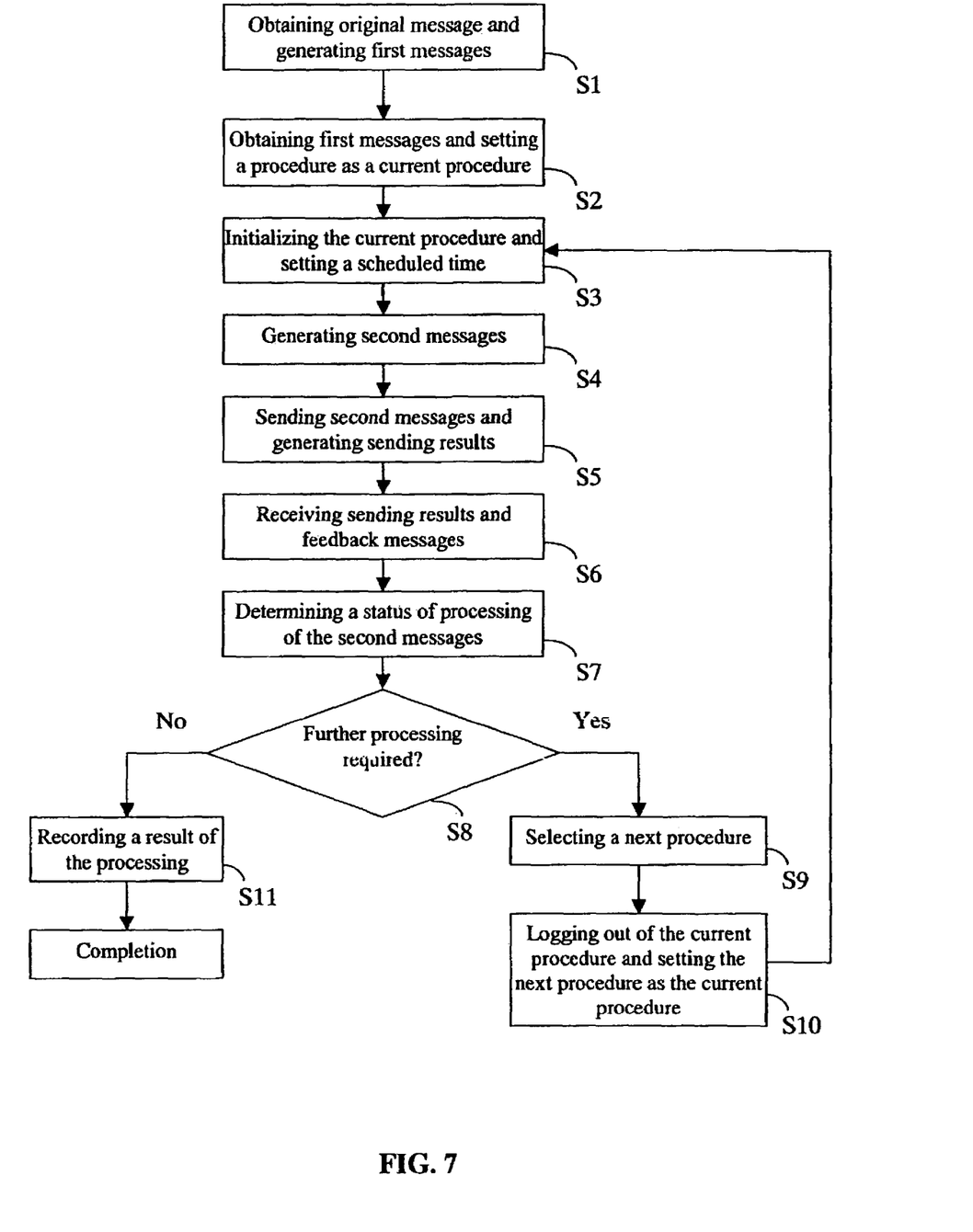
FIG. 7 is a flow chart of operation of the multimedia messaging system of FIG. 1.

FIG. 7 is a flow chart of operation of the multimedia messaging system 6. At step S1, the message converting sub-module 661 obtains an original messages by accessing the original message cache 64 and generates corresponding first messages according to basic setting data obtained by accessing the database 61. At step S2, the message procedure control sub-module 663 obtains the first messages, and sets a procedure relating thereto as a current procedure. At step S3, the time control sub-module 662 initializes the current procedure, and sets a predetermined scheduled time for processing the current procedure. At step S4, the message sending processing sub-module 665 generates second messages corresponding to the first messages according to the current procedure and data on the first messages. The second messages each comprise a message classification, a processing step, a first message content, a client, a transmission mode code, and a sending address. At step S5, the message sending module 68 sends the second messages, and generates a sending result for each second message. At step S6, the feedback receiving sub-module 667 receives the sending results and feedback messages sent by the message receivers 4. At step S7, the message status determination sub-module 664 determines a status of processing of the second messages. At step S8, the message status determination sub-module 664 determines whether further processing is required, based on the determination of a status of processing of the second messages. That is, if the status of sending failure, sending overtime and no feedback is "FailEnd" and the status of feedback received is "OkEnd," then no further processing is required. Otherwise, further processing is required. If no further processing is required, at step S11, a result of the processing is recorded, and the processing of the second messages is ended. If further processing is required, at step S9, a next procedure is selected. At step S10, the just-performed current procedure is logged out, and the next procedure selected is set as the current procedure. Processing of the second messages then returns to step S3, with due alteration of details.

Although only preferred embodiments of the present invention have been described in detail above, those skilled in the art will readily appreciate that many modifications to the preferred embodiments are possible without materially departing from the novel teachings and advantages of the present invention. Accordingly, all such modifications are deemed to be covered by the following claims and allowable equivalents of the claims.

What is claimed is:

1. A multimedia messaging system, comprising:
   a database for storing data on message procedures, wherein the data on message procedures are used far defining procedures for messages of various classifications and modes of transmission for each of the procedures;
   a message processing module for receiving original messages sent by a plurality of message providers, generating respective second messages based on the data on message procedures, and controlling a process time for each of the second messages;
   a message sending module for selecting modes of transmission according to information on transmission modes in the second messages, and for sending the second messages to corresponding message receivers;

wherein the message processing module comprises:
- a feedback receiving sub-module for receiving feedback messages sent by message receivers;
- a time control sub-module for setting a scheduled processing time for each of the current procedures;
- a message status determination sub-module for determining statuses of processing of the second messages;
- a message procedure control sub-module for selecting next procedures and setting the next procedures as respective current procedures; and
- a message sending processing sub-module for generating the second messages.

2. The multimedia messaging system as claimed in claim 1, further comprising a basic data setting module for setting of basic data on message procedures by a system administrator.

3. The multimedia messaging system as claimed in claim 2, wherein the basic data setting module can run on a web server that is accessible for the system administrator.

4. The multimedia messaging system as claimed in claim 1, wherein the message processing module further comprises a message convening sub-module for receiving original messages, obtaining basic data relating to the original messages, and generating respective first messages, each of the first messages comprising a message classification, an original message content and a client, and the message sending processing sub-module obtains the first messages and data on message procedures, and generates respective second messages.

5. The multimedia messaging system as claimed in claim 1, wherein the feedback receiving sub-module further receives sending results.

6. The multimedia messaging system as claimed in claim 1, wherein a message status of processing of each of the second messages comprises any one or more of sending failure, no feedback and feedback received.

7. The multimedia messaging system as claimed in claim 6, wherein the message status of processing of each of the second messages further comprises sending overtime.

8. The multimedia messaging system as claimed in claim 1, wherein the message processing module further comprises a message procedure record sub-module for generating message processing records according to results of processing and storing the records in the database.

9. The multimedia messaging system as claimed in claim 1, wherein the data on message procedures comprise message classifications, procedure codes, transmission mode codes, and next procedure codes that relate to statuses of processing of second messages.

10. The multimedia messaging system as claimed in claim 1, wherein the message processing module further comprises a message procedure record sub-module for generating message processing records according to results of processing, said message processing records being stored in the database.

11. A multimedia messaging method comprising the steps of:
- (a) receiving an original message sent by a message provider, and generating one or more corresponding first messages;
- (b) obtaining an initial procedure for the first messages by querying data on message procedures stored in a database, and setting the initial procedures as a current procedure;
- (c) generating second messages according to the current procedure and data on the first messages and setting a scheduled processing time for the current procedure, each of the first messages comprising a mode of transmission, the mode of transmission indicating a transmission medium through which the corresponding second message is to be sent;
- (d) sending the second messages, receiving one or more feedback messages for one or more of the second messages, and generating sending results for the second messages;
- (e) determining a status of processing of each of the second messages according to any feedback message therefor and a corresponding sending result, wherein the status of processing may be any of sending failure, no feedback or feedback received, and determining whether further processing of one or more of the second messages is required;
- (f) obtaining a next procedure and setting the next procedure as a current procedure if further processing of one or more of the second messages is required; and
- (g) returning to the step (c) and proceeding accordingly until no further processing is required.

12. The multimedia messaging method as claimed in claim 11, wherein the status of processing of each of the second messages may further be processing overtime.

* * * * *